United States Patent
Davarian et al.

(10) Patent No.: US 6,208,835 B1
(45) Date of Patent: Mar. 27, 2001

(54) METHODS FOR ENHANCING SERVICE AND REDUCING SERVICE COST IN MOBILE SATELLITE SYSTEMS

(75) Inventors: Faramaz Davarian, Los Angeles; Shou Chen, West Covina, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/109,012

(22) Filed: Jul. 1, 1998

(51) Int. Cl.$^7$ .................................................. H04B 1/38
(52) U.S. Cl. .............................. 455/10; 455/69; 455/428; 455/429
(58) Field of Search .................................. 455/3, 69, 504, 455/505, 506, 67.6, 428, 429, 445, 10

(56) References Cited

U.S. PATENT DOCUMENTS

| | | | |
|---|---|---|---|
| 5,815,796 | * 9/1998 | Armstrong et al. | 455/10 |
| 5,878,329 | * 3/1999 | Mallinckrodt | 455/69 |
| 5,966,658 | * 10/1999 | Kennedy, III et al. | 455/426 |
| 6,011,956 | * 1/2000 | Yamano et al. | 455/67.1 |

OTHER PUBLICATIONS

Robert G. Winch., *Telecommunication Transmission Systems*, McGraw–Hill, Inc, New York, 1993, pp. 182–186.

\* cited by examiner

*Primary Examiner*—Thanh Cong Le
*Assistant Examiner*—Alan Gantt
(74) *Attorney, Agent, or Firm*—V. D. Duraiswamy; M. W. Sales

(57) ABSTRACT

Methods are provided for determining and enhancing the service efficiency of mobile communications. To assess communication efficiency in each communication region of interest, a signal-fading record is generated for that region and this record is then analyzed to find availability and energy cost for each of a plurality of power-control parameter sets. The results facilitate the selection of power-control parameter sets that enhance system efficiency in each communication region.

8 Claims, 6 Drawing Sheets

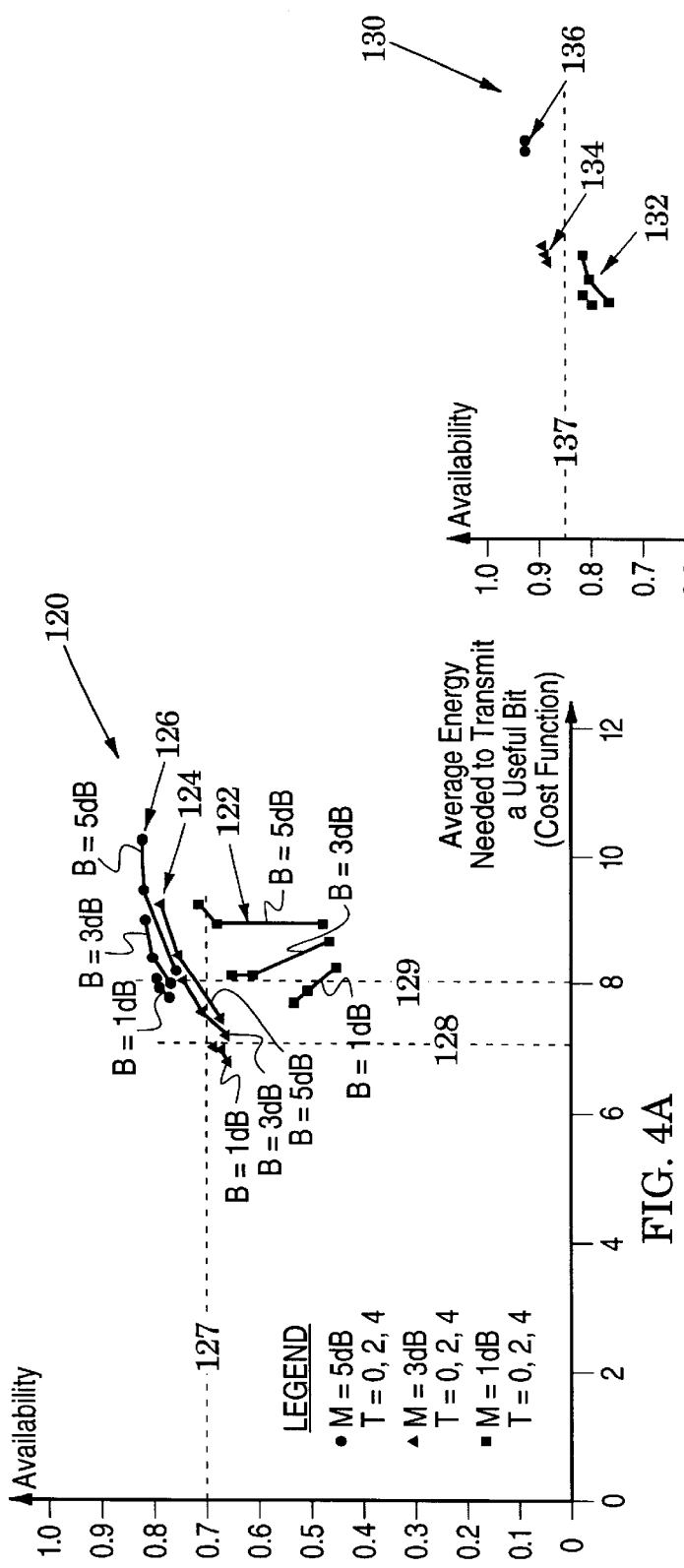
FIG. 4A
FIG. 4B

METHODS FOR ENHANCING SERVICE AND REDUCING SERVICE COST IN MOBILE SATELLITE SYSTEMS

BACKGROUND OF THE INVENTION

1. Field of the Invention

The present invention relates generally to mobile communications systems.

2. Description of the Related Art

In modern communication systems, the term "mobile" typically refers to a radio terminal that is attached or carried in a high-speed mobile platform (e.g., a cellular telephone in a moving vehicle). This is in contrast to the term "portable" which typically refers to a hand-held radio that is used by a person at walking speed (e.g., a cordless telephone inside a home).

Subscribers generally pay a fee to use a mobile communication system such as the exemplary system 20 of FIG. 1. The system 20 has one or more satellites 22 in orbits (e.g., geostationary) about the earth 24. The satellites 22 have transmit-receive communication links 26 (e.g., at L-band frequencies) with various mobile units 28. The satellites 22 also have communications (e.g., at optical wavelengths) through links 30 to other satellites and links 32 with various system ports that form "gateways" into independent communication systems.

Exemplary gateways are a public-switched telephone network (PSTN) 34 and an access port 36 of a cellular telephone system. The PSTN 34 allows any of the mobile units 28 to communicate over telephone lines 38 with telephone system customers 40. The access port 36 of the cellular system typically has a plurality of transceivers arranged in a cellular network so that communications from the satellites 22 can be transmitted over cellular links 42 to mobile users 44 of the cellular system.

Communications with the mobile units 28 are subject to fading which is a temporary random decrease in the received signal level. The principal types of fading are multipath fading and power fading. Multipath fading occurs in areas where multiple reflected signals (e.g., from nearby buildings) arrive at the mobile unit. The combined power of these signals can vary widely because it is dependent upon the phasing of the signals.

Power fading is caused by blockage of the transmitted signal by fixed structures (e.g., trees and buildings). The received power of a mobile unit can drop dramatically (e.g., on the order of 10 or 20 dB) as it moves into the transmission shadow of such structures. Accordingly, this type of fading is also referred to as shadowing.

FIG. 2 illustrates a typical scenario 50 of power fading. A mobile unit 52 receives signals from a satellite 54 as the unit moves along a road 56 which borders a line of trees 58. Initially, the mobile unit receives signals along a transmission path 60 which is not blocked by the trees. At a subsequent point along the road 56, the mobile unit receives signals along a transmission path 62 which must pass through the canopy of the trees 58. As a result, the signal power at the mobile unit fades. Typically, fading increases with decrease in the elevation angle 64 of the satellite's transmission path.

Extensive studies of shadowing (e.g., see Goldhirsh, Julius, et al., *Propagation Effects for Land Mobile Satellite Systems*, National Aeronautics and Space Administration Reference Publication 1274, February, 1992) have documented the degree of tree shadowing in different scenarios.

As might be expected, the shadowing depends upon a variety of factors such as the tree density, the type of trees, the season and the elevation angle of the transmission path.

Availability is a term often used to define a communication system's reliability. In particular, availability is the fraction of transmission time that communication signals are successfully received. Although an availability of 100% is seldom achieved, this is a goal of communication system design.

In a conventional passive process for improving availability, transmitted signal power is increased by a link margin $L_{mg}$ above a predetermined power threshold $P_{th}$ that is necessary for successful reception (e.g., see Robert G. Winch., *Telecommunication Transmission Systems*, McGraw-Hill, Inc, New York, 1993, pp. 182–186). Although the use of a significant link margin can improve availability in areas subject to heavy shadowing, it also increases the transmission energy and, hence, the transmission cost of the communication system. The cost of satellite-based communication systems are especially sensitive to increases in link margin.

A more efficient approach is an active system that is conventionally referred to as power control. In power control, transmitted power is increased over the power threshold $P_{th}$ by a static power margin M that is reduced from the link margin $L_{mg}$. When a fade in received power exceeds the static power margin M, the transmitted power is temporarily increased by a boost B. The boost B is then removed in response to the fade's termination. Typically, boost removal is delayed from fade termination by a hold time T.

In comparison to passive processes, active power control allows transmitted power to be reduced generally by $L_{mg}-M$ with temporary power increases of B applied in response to excessive fading. In this process, additional transmitted power is directed only to those system users that are experiencing fading. Because the number of users experiencing fades is generally smaller than the total number of users, power control systems can improve the ratio of availability to cost.

Although conventional power control techniques facilitate an increase in system efficiency, they are generally applied without any means for assessing their efficiency nor any means for determining parameter selections that would further enhance that efficiency.

SUMMARY OF THE INVENTION

The present invention is directed to power control methods that include processes for determining and enhancing the efficiency of mobile communications in different service regions.

These goals are achieved with processes that receive transmitted signals in communication regions to obtain a signal-fading record for each region. Subsequently, each signal-fading record is analyzed to find availability and energy cost for each of a plurality of power-control parameter sets. An exemplary parameter set $S_i$ includes a selected static power margin $M_i$, a selected power boost $B_i$ and a selected hold time $T_i$.

In one process of the invention, a minimum availability $A_{min}$ is chosen for each region and, from the parameter sets of that region whose availability is not less than $A_{min}$, the parameter set with the least energy cost is selected. Finally, communication signals are transmitted to that region with the selected parameter set.

The teachings of the invention thus allow a communication provider to reduce energy costs while being certain of providing communication users with an availability that is not less than a predetermined minimum.

In another process of the invention, a maximum energy cost $C_{max}$ is chosen for each region and, from the parameter sets of that region whose energy costs do not exceed $C_{max}$, the parameter set with the greatest availability is selected. Communication signals are then transmitted to that region with the selected parameter set. A communication provider can thus provide the greatest possible availability while being certain of not exceeding a predetermined maximum energy cost.

The teachings of the invention can be applied to any transmitter of of the communication system 20 of FIG. 1, but they are especially advantageous for the satellites 22 because their energy sources are limited and their income-generating ability is related to the number of communication users they can serve. This number can be increased by increasing the operating efficiency of each satellite.

The novel features of the invention are set forth with particularity in the appended claims. The invention will be best understood from the following description when read in conjunction with the accompanying drawings.

BRIEF DESCRIPTION OF THE DRAWINGS

FIGS. 4A and 4B are graphs which illustrate prototype tests of the present invention with a mobile unit in two exemplary field locations;

DETAILED DESCRIPTION OF THE PREFERRED EMBODIMENTS

Methods of the present invention provide processes for determining and enhancing the service efficiency of mobile communications. An understanding of a detailed description of these methods will be facilitated by preceding this description with the following introduction into power control processes, timing and nomenclature.

Figure 1:
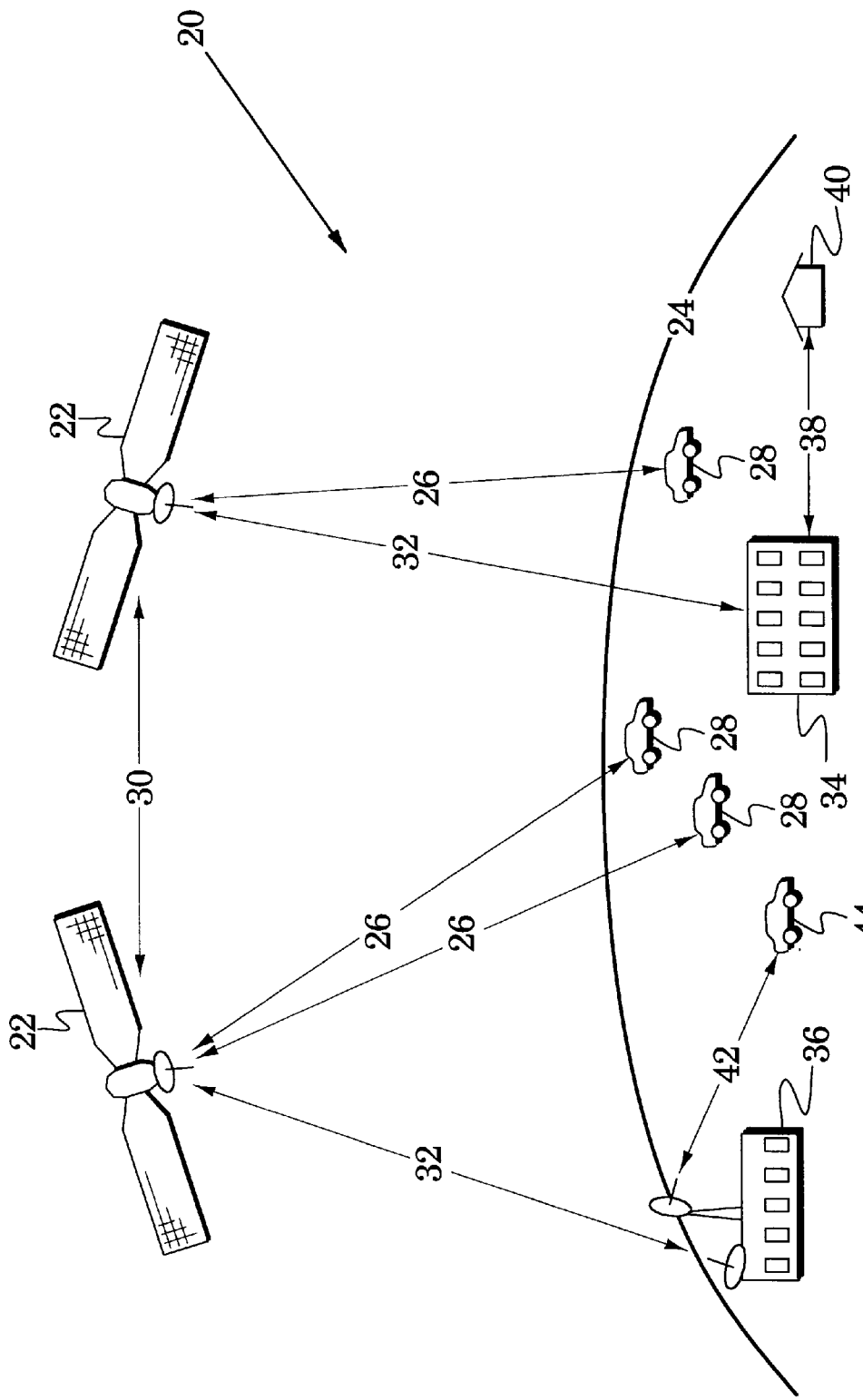
FIG. 1 is a schematized view of an exemplary mobile satellite communications system.
Figure 3:
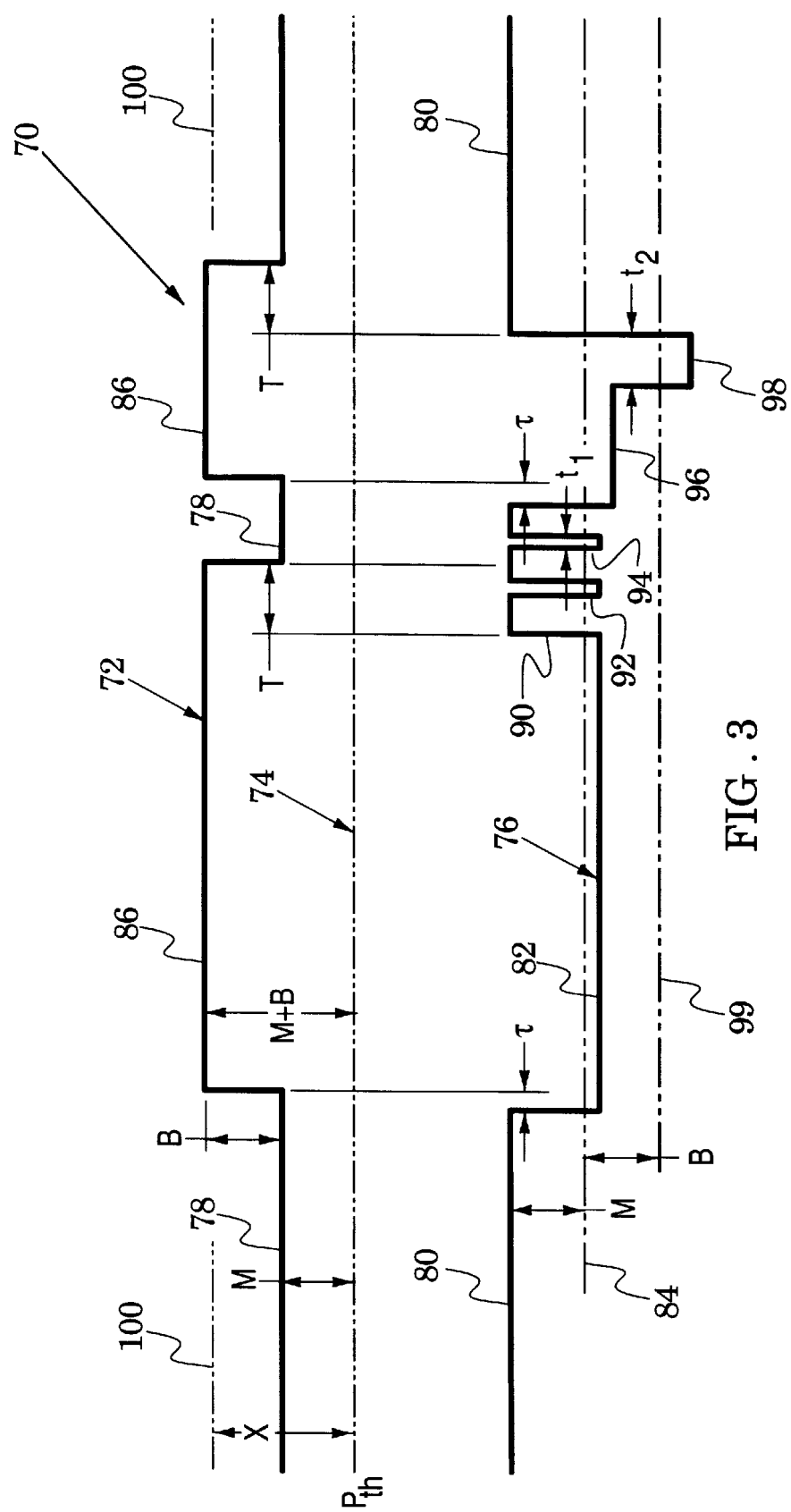
FIG. 3 is a timing diagram which illustrates power control processes, timing and nomenclature as applied to the present invention.

FIG. 3 illustrates a timing graph 70 of power control processes in one of the transmission links of FIG. 1 (e.g, the down-links 26 to mobile units 28). The graph 70 includes a plot 72 of the power of transmitted signals, a predetermined power threshold ($P_{th}$) 74 that is necessary for successful reception in the absence of fading and a plot 76 of the power of received signal power. The transmitted power 72 has a nominal level 78 that exceeds the threshold 74 by a static power margin M.

In the absence of fading, the received power has a nominal level 80. In an exemplary fading, the received power fades to a level 82. Because this power fade exceeds the static power margin M (as indicated by the broken line 84), power control activates a boost B of the transmitted power to a new level 86 (static power margin M and boost B are typically expressed in decibels (dB)). At this time the fade margin of the transmitted power 72 has increased from the static fade margin M to a boosted fade margin of M+B. In this case, the fade is captured by power control, i.e., successful reception is achieved.

The power boost B is delayed from initiation of the power fade by a boost delay time τ. Because of fading, the signals transmitted from the mobile unit exhibit the same power fade as the signals received by the mobile unit. Thus, detectors in the communication satellite can be used to detect the fade in the satellite's received power. In response, the satellite's transmitted power is then boosted by the power boost B. In this exemplary boost activation process, detection begins one signal transit time following initiation of the power fade. After a processing time, power is boosted and the boosted power level arrives at the mobile unit following another signal transit time.

Typical signal transit times from satellites in geostationary orbits are on the order of 120 milliseconds. When this transit time is doubled and increased by the processing time, the total boost delay time τ has a nominal value that is somewhat less than one second. The delay time τ is reduced if the orbit altitude is less than that of a geostationary orbit. For example, the signal transit time is less than ½ second for a satellite in a low earth orbit (LEO).

In another exemplary boost activation process, a system gateway (e.g., the PSTN 34 of FIG. 1) detects power fades. In response to a detected fade, the gateway sends a fade signal to the satellite which then boosts the transmitted signal. Accordingly, gateway detection systems typically add an additional pair of transit times to the delay time of satellite detection systems.

In all power control systems, it is apparent from FIG. 3 that signal reception is lost for a boost delay time τ for each occurrence in which a received power fade exceeds the static power margin M.

FIG. 3 indicates a termination 90 of the received power fade. Following a hold time T, the boost B is removed and transmitted power 72 falls back to its nominal level 78. It has been found that the introduction of the hold time T often improves the effectiveness of power control because it reduces excessive toggling of the boost.

For example, FIG. 3 indicates another fade 92 of received power which exceeds static power margin M. Depending upon the duration of the face 92, it might or might not initiate a power boost on its own. Because of the hold time T, however, the boosted transmitted power is still present and prevents a loss of reception without the need for initiation of another boost cycle.

In contrast, momentary fades (e.g., the fade 94) whose fade time $t_1$ is less than the boost delay time τ, and which occur after the hold time T, will not be benefited by power control. Even if the transmitted power is boosted, this boost arrives too late to prevent the loss of reception during the fade.

The timing diagram of FIG. 3 indicates that the timing of the hold time T is uninterrupted once it has been initiated by the termination 90 of a power fade. In other embodiments of the invention, the hold time T can continue to be initiated by each power fade that occurs prior to the end of the hold time. In this embodiment, for example, the hold time T would be reinitiated by the power fade 92 if its duration exceeds the delay time τ. This method for initiating hold times may be more effective for certain mobile communication locales.

Following the fade 94, the timing diagram 70 indicates that received power 76 again fades to a fade level 96 that exceeds the static power margin M. In response, the transmitted power 72 is boosted by boost B to the level 86 after a boost delay time τ. Subsequently, the received power fades further to a level 98 which exceeds a fade of M+B (as indicated by the broken line 99). Fades of this intensity cannot be captured by power control, i.e., reception is lost during the time $t_2$ of a fade that exceeds M+B.

However, various power control modifications may be made to further improve availability. For example, the power control system may provide multilevel boosts such as a selected first boost $B_1$ and a selected second power boost $B_2$ that is larger than the boost $B_1$. Activation of these power boosts would depend on the magnitude of the received fade level 82 in FIG. 3 (e.g., a fade greater than M+$B_1$ would initiate a boost of $B_2$).

In contrast to an active power control system, a static communication system typically transmits signals with a static level that exceeds the power threshold 74 by a fixed link margin $L_{mg}$. The fixed link margin $L_{mg}$ generally exceeds the static power margin M. Although it is shown by a broken line 100 in FIG. 3 to be somewhat less than M+B, this relationship is a function of each specific communication system. It is apparent that the power savings of a power control system is $L_{mg}$–M during periods in which power fades are less than M. Although this savings is reduced because of the boost B during power fades that exceed M, power control still increases system efficiency except in cases where such fades are extremely numerous.

As previously stated, teachings of the present invention provide processes for determining and enhancing the service efficiency of mobile communications. In these teachings, the results of various possible power control settings are assessed over a measured time $T_{mes}$. Without power control but with a power margin M, availability is given by $$V = 1 - \frac{D_{tot}}{T_{mes}} = \frac{T_{mes} - D_{tot}}{T_{mes}} \quad (1)$$

in which $D_{tot}$ is the total time in which signal fades exceed M. In a power control communications system, availability is $$V_{pc} = 1 - \frac{D_{tot} - [\sum(D_i) - D_\tau]}{T_{mes}} \quad (2)$$

In equation (2), $D_i$ is the duration of the $i^{th}$ fade that is captured by power control so that $\Sigma D_i$ is the total time in which fades exceed M but do not exceed M+B. $D_\tau$ is the total time that reception is lost due to the first portion of faded signals that have been captured by power control, i.e., $D_\tau$ equals τ times the total number of fades captured by power control.

A communication system user can therefore use a figure of merit given by $$r = \frac{V_{pc}}{V} \quad (3)$$

to assess the value of power control.

If w denotes satellite power in watts that is allotted to one communication channel, this power is increased, during power control capture, to wb in which $b=10^{0.1B}$. Without power control, the satellite energy per communication channel is $$E = wT_{mes} \quad (4)$$

and with power control, the satellite energy per communication channel is $$E_{pc} = wT_{mes}\left\{1 + (b-1)\frac{D_{pc}}{T_{mes}}\right\} \quad (5)$$

or $$E_{pc} = E + D_{pc}(b-1)w \quad (6)$$

in which $D_{pc}$ is the total time duration that power control is activated and (b–1)w is the additional power transmitted.

When power control is used, a useful service time can be defined to be $$S_{pc} = \beta_{V_{pc}} V_{pc} T_{mes} \quad (7)$$

and a useful service time without power control is $$S = \beta_V V T_{mes} \quad (8)$$

in which $\beta_{V_{pc}}$ and $\beta_V$ are coefficients less than one. The coefficients account for the data lost or communication links dropped during deep fades and are a function of availability. Lost data must generally be retransmitted while lost links must be re-established with consequent call setup overhead (i.e., increased cost).

Operational cost function C is defined as satellite energy used for each second of useful service time. An equivalent definition is the average energy needed to transmit a useful bit of information. When power control is used, the cost function is $$C_{pc} = \frac{E_{pc}}{S_{pc}} \quad (9)$$

and without power control, the cost function is $$C = \frac{E}{S}. \quad (10)$$

The teachings of the invention facilitate decreases in the operational cost function $C_{pc}$ by proper selection of values of various parameters such as hold time T and power boost B. Static power margin M can also be a variable parameter. In this more general case, the operational cost function of equations (9) and (10) are changed to $$C_{pc} = m\frac{E_{pc}}{S_{pc}} = m\frac{E + D_{pc}(b-1)w}{B_{V_{pc}}V_{pc}T_{mes}} \quad (11)$$

and $$C = m\frac{E}{S} \quad (12)$$

in which an adjustment $m=10^{M/10}$. This adjustment is needed because larger fade margins (M) increase the satellite power provided to each unit. Thus, the cost function must be appropriately penalized.

Among possible sets of variable communication parameters, the processes of the invention facilitate the selection of a parameter set that minimizes the cost functions $C_{pc}$ of equations (9) and (11).

Prototype tests of the teachings of the present invention were conducted under real field conditions. These tests were carried out with a mobile unit at various locations in the United States with communication signals received from a geostationary satellite (MARECS-B at orbital position of 304.5° E) at a carrier frequency of 1.542 GHz. The mobile unit's sampling rate was 1000 samples/second, the data resolution was 0.01 dB and the receiver's dynamic range was 25 dB.

The mobile unit's received power in each region formed a record of actual fading for that region. For each of a plurality of parameter sets, this fading record was then analyzed (with a genetic algorithm) to determine the availability and the energy cost that would result in that region when signals were transmitted with that parameter set.

Figure 2:
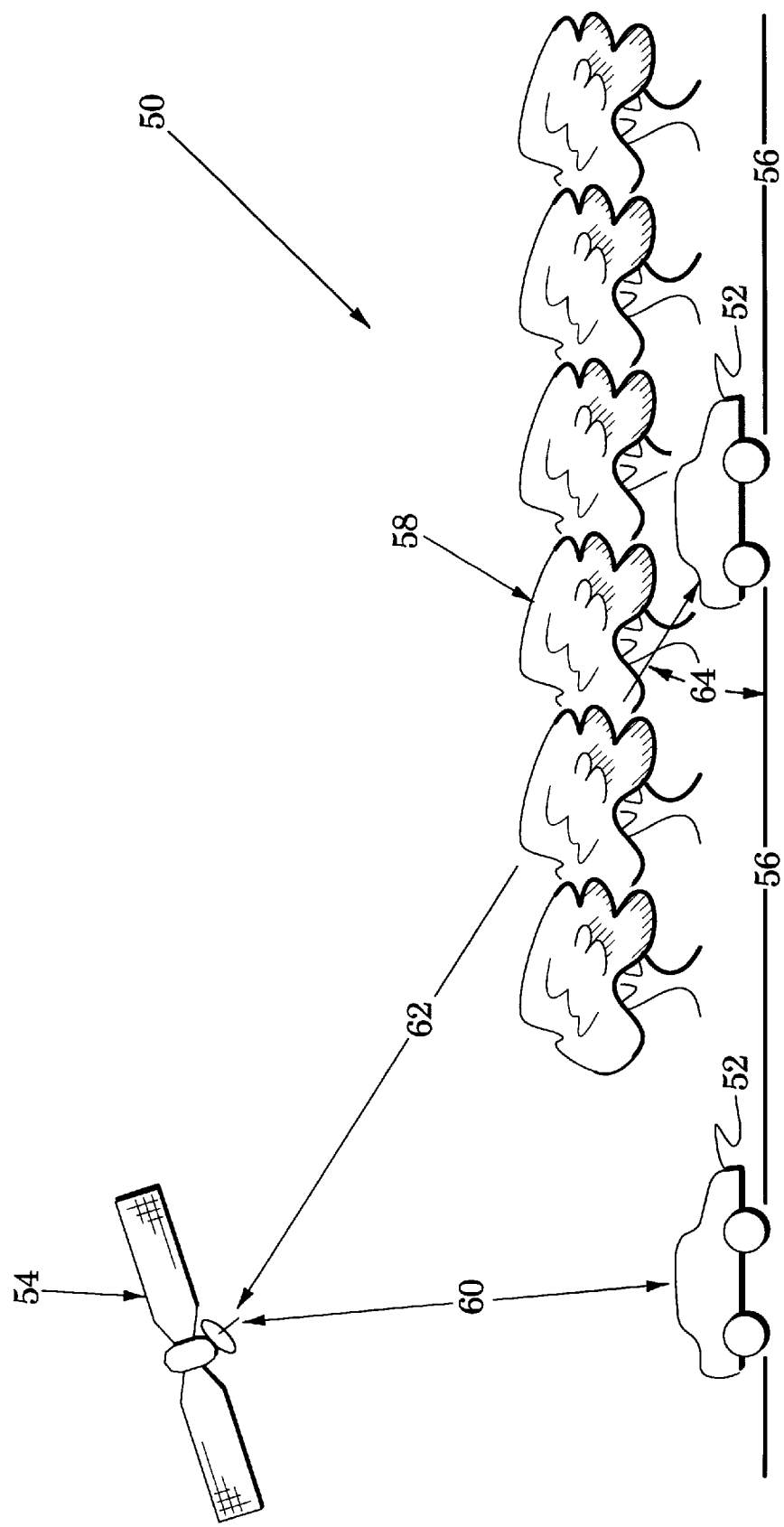
FIG. 2 is a side elevation view of a portion of the satellite communications system of FIG. 1 which illustrates mobile unit power fading that is addressed by the present invention.

The test results for two exemplary locations are shown in the graphs 120 and 130 of FIGS. 4A and 4B respectively. Each graph plots availability as a function of the average energy needed to transmit a useful bit (i.e., operational cost function $C_{pc}$). The mobile unit location for the tests summarized in FIG. 4A was in the western portion of the state of Washington. This location was wooded and the satellite elevation angle (angle 64 in FIG. 2) was ~7 degrees. The mobile unit location for FIG. 4B was near Schaumburg, Illinois. This latter location was rural, not wooded and the satellite elevation angle was ~30 degrees.

Each parameter set was made up of selected values of static power margin M, power boost B and hold time T. As indicated in the legend of graph 120, the analyzed results for a first group of parameter sets is represented by solid squares. In this group, the static power margin M was held at 1 dB with power boost variations of 1, 3 and 5 dB and with hold time variations of 0, 2 and 4 seconds. The results of this group of parameter settings is shown in the plot group 122 where data points with common power boosts are connected by solid lines. For clarity of illustration, different hold times are not noted but are distinguishable because increased hold time increases availability.

Test results with the static power margin M increased to 3 dB and further increased to 5 dB are respectively shown with solid triangles and solid circles and respectively labeled as plot groups 124 and 126. In each plot group, availability was improved as the hold time T was increased. The analyzed test results of FIG. 4A enable a communication system designer to determine performance of various parameter sets with respect to cost function and availability. As a first example, it is apparent that increasing the static power margin from 1 dB to 3 dB in the test region caused a significant improvement in availability whereas availability increase was less dramatic when the static power margin was further increased to 5 dB. In addition, the availability improvement with a static power margin of 3 dB was generally gained with a decrease in the cost function $C_{pc}$. In contrast, the availability improvement with a static power margin of 5 dB required an appreciable increase in the cost function $C_{pc}$.

Second, FIG. 4A shows that increasing the power boost generally increased availability when the static power margin was 1 dB. However, this increase was realized with a substantial increase in cost function. When the static power margin was 5 dB, increased power boost again required a substantial increase in cost function but with very little gain in availability. The results when the static power margin was 3 dB fell between those for static power margins of 1 and 5 dB.

Thirdly, it is seen that large availability increases were realized with increased hold times when the static power margin was 1 dB (plot group 122). These improvements required very little increase in the cost function (even a decrease in cost function in some cases). With a static power margin of 5 dB, increasing the hold time required significant increases in the cost function with only moderate increase in availability. The results with a static power margin of 3 dB fell between those with static power margins of 1 and 5 dB.

It can be further observed that availability is not appreciably increased by increased power boost unless this is accompanied with significant hold times. This follows because many fades have a short time duration. Thus, power boosts do not occur soon enough to be beneficial. Availability is enhanced mainly by catching the fades which follow the one that triggered activation of power control.

As stated above, the first location was wooded and had a low satellite elevation angle. At this location, increased power boost and increased hold time gave large efficiency improvements when the static power margin was low. Increasing these two parameters was less beneficial as the power margin increased.

The teachings of the invention facilitate efficient choices of communication parameters which enhance mobile communications service. In a first example, assume the designer of a communication system for the region of FIG. 4A wished to provide service with the lowest possible cost. The test results show that an appropriate parameter set would be the set of M=3 dB, B=1 dB and T=0 seconds. For this selection, the cost function would be on the order of 6.7 and availability would be on the order of 0.66.

In a second example, assume that the communication system designer wished to provide mobile customers with an availability of at least 70% as indicated by the broken line 127. FIG. 4A shows that this availability can be achieved most efficiently (i.e., with the least cost function) with a parameter set of M=3 dB, B=3 dB and T=2 seconds.

In a third example, assume that the communication system designer wished to provide service to his mobile customers without exceeding a cost represented by the broken line 128. With this limitation on cost, FIG. 4A shows the greatest availability can be provided with a parameter set of M=3 dB, B=1 dB and T=4 seconds.

Finally, assume that the communication system designer was willing to raise his cost to the broken line 129. With this revised limitation on cost, FIG. 4A shows the greatest availability can be provided with a parameter set of M=5 dB, B=1 dB and T=4 seconds.

In the service region associated with FIG. 4A, communication signals have a low satellite elevation angle and must often penetrate thick tree cover to reach mobile units. In contrast, communication signals in the region of FIG. 4B have a high satellite elevation angle and seldom encounter a tree cover. In this region, the test results for each setting of static power margin lie very close to each other. Accordingly, they are not clearly differentiated and are only shown in general groups 132, 134 and 136. Similar to FIG. 4A, test results with static power margins of 1 dB, 3 dB and 5 dB are respectively indicated with solid squares, triangles and circles.

Availability of ~80% is achieved in this region with a static power margin of 1 dB and is only slightly changed by increases in boost and hold time. The availability is raised to ~90% when the static power margin is increased to 3 dB. This availability increase requires only a slight increase in cost function. In contrast, availability can be raised above 90% by increasing the static power margin to 5 dB but a significant increase in cost function is required.

Availability in this communication region is basically a function of static power margin and is only minimally affected by changes in boost power and hold time. Minimum cost function would be realized with a parameter set in which M=1 dB (plot group 132). A minimum desired availability of ~85% (represented by the broken line 137) could be provided at the lowest cost with a parameter set in which M=3 dB (plot group 134).

FIGS. 4A and 4B graphically illustrate availability and cost function for two different mobile service regions. In practicing the methods of the invention, analysis of test data to find relationships of the invention (e.g., equation (11) above) can be accomplished with various conventional data analysis tools (e.g., a numerical-optimization method such as a genetic algorithm).

Figure 5:
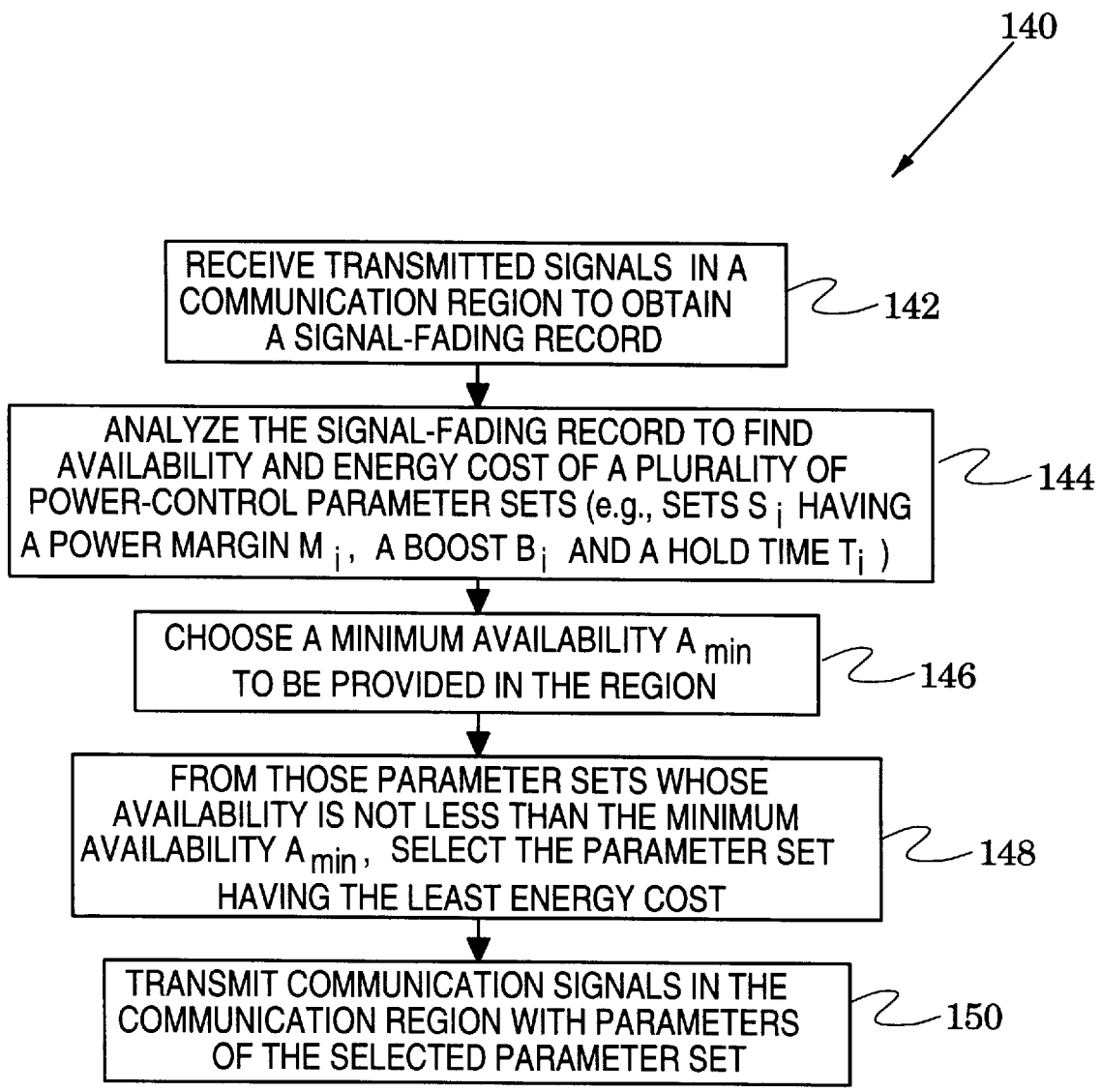
FIG. 5 is a flow chart which shows exemplary methods of the present invention.

Processes of the invention are exemplified in the flow chart 140 of FIG. 5. The flow chart begins with process step 142 in which transmitted signals are received in a communication region to obtain a signal-fading record. This record is then analyzed in step 144 to find availability and energy cost for each of a plurality of power-control parameter sets which have exemplary parameters of power margin $M_i$, boost $B_i$ and hold time $T_i$.

A minimum availability Amin is chosen for the communication region in step 146 (i.e., an energy cost which a communication provider is willing to incur). In step 148, the parameter set with the least energy cost is then selected from those parameters sets whose availability is not less than the minimum availability Amin. In step 150, communication signals are then transmitted in the communication region with signal parameters set to those of the selected parameter set.

As exemplified by the graphs 120 and 130 of FIGS. 4A and 4B, the processes of FIG. 5 may lead to the selection of different parameter sets for different communication regions and that selection is directed by the signal-fading records of each region. Thus, the communication provider can reduce his energy costs while being certain of providing communication users an availability that is not less than a predetermined minimum availability $A_{min}$. Although the teachings of the invention are applicable to any transmitter (e.g., the mobile units 28 or the gateway 36) in the communication system 20 of FIG. 1, they are especially advantageous for the satellites 22 whose energy sources are limited and whose income-generating ability is related to the number of communication users they can serve. Accordingly, it is especially important for the satellites to operate as efficiently as possible.

Figure 6:
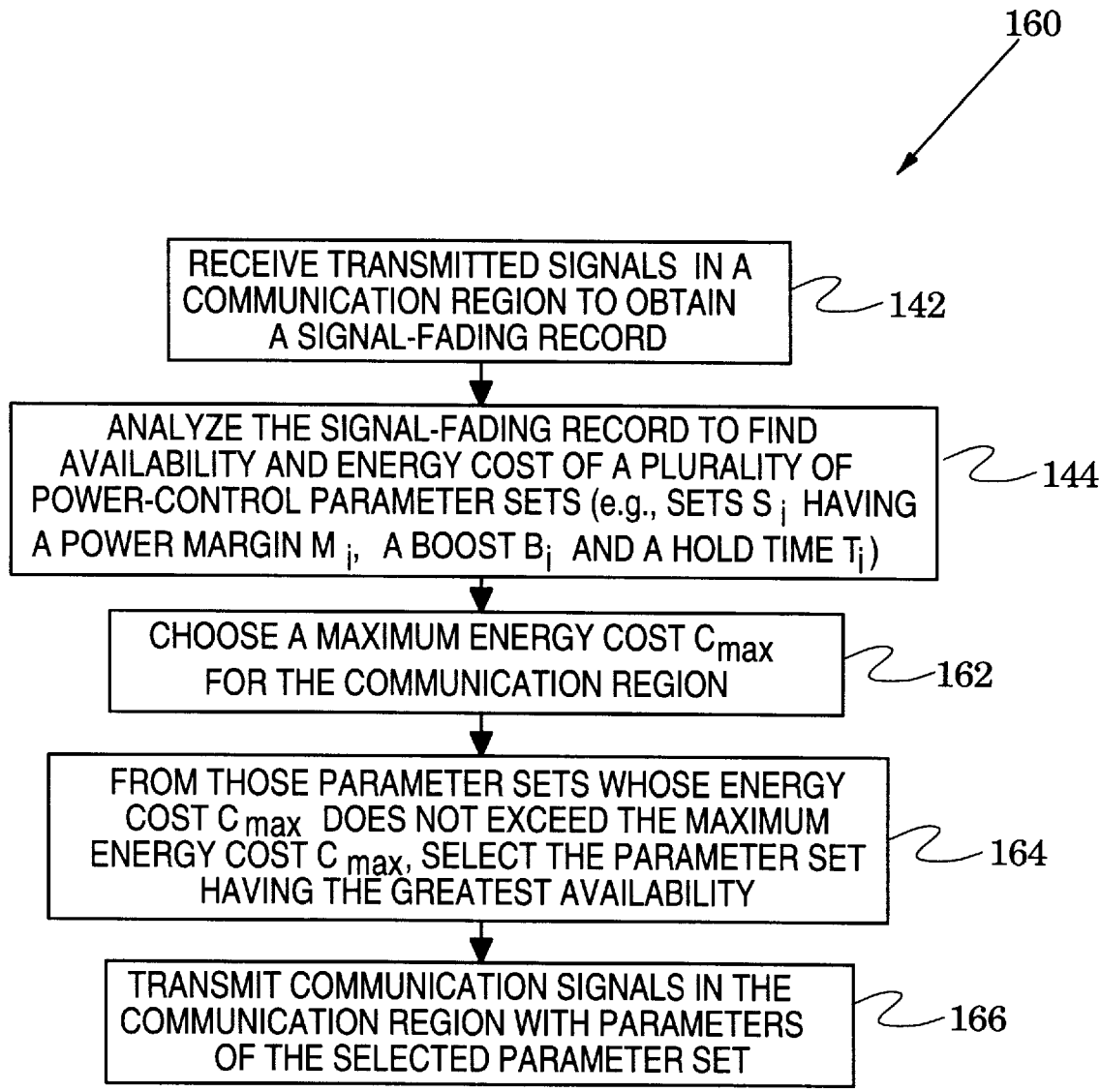
FIG. 6 is a flow chart which shows other exemplary methods of the present invention.

Other processes of the invention are exemplified in the flow chart 160 of FIG. 6. The flow chart 160 is initiated by the initial steps 142 and 144 of FIG. 5. In contrast to the processes of FIG. 5, a maximum energy cost $C_{max}$ is chosen for the communication region in step 162 (i.e., an energy cost which a communication provider is willing to incur). In step 164, the parameter set with the greatest availability is then selected from those parameters sets whose energy cost does not exceed the maximum energy cost $C_{max}$. In step 166, communication signals are then transmitted in the communication region with signal parameters set to those of the selected parameter set.

Thus, the communication provider is assured of providing the best availability possible while not exceeding the maximum energy cost $C_{max}$ which the provider can accept.

Although processes of the invention have been described primarily with reference to downlink transmission from a satellite to a mobile unit (e.g., along the communication links 26 of FIG. 1), these teachings also can be applied to uplink transmission from mobile units to a satellite.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of enhancing service and service cost in a communication region served by a mobile communication system in which reception during the absence of power fades requires that transmitted power exceed a power threshold $P_{th}$, the method comprising the steps of:

receiving transmitted signals in said communication region to obtain a signal-fading record;

analyzing said signal-fading record to find availability and energy cost for each of a plurality of power-control parameter sets $S_i$ wherein availability is the percentage of transmitting time in which signals are received, energy cost represents the average energy needed to transmit a received bit of information, and an ith power-control parameter set $S_i$ includes a selected static power margin $M_i$ a selected power boost $B_i$ and a selected hold time $T_i$;

choosing a minimum availability Amin to be provided in said communication region;

selecting, from said power-control parameter sets, a selected power-control parameter set that realizes said minimum availability $A_{min}$ for the lowest energy cost; and subsequent to said receiving, analyzing, choosing and selecting steps, transmitting communication signals to said communication region with said selected power-control parameter set.

2. The method of claim 1, wherein said transmitting step includes, for a power-control parameter set $S_i$, the steps of:

transmitting signals with power equal to the sum of said power threshold $P_{th}$ plus said static power margin $M_i$;

in response to the start of each power fade F that exceeds said static power margin $M_i$, boosting the transmitted power of said signals by said power boost $B_i$; and in response to the end of each power fade F, terminating said boosting step after said hold time $T_i$.

3. The method of claim 2, wherein said $i^{th}$ power-control parameter set $S_i$ also includes a selected larger power boost $B_{l_{gi}}$ that is larger than said power boost $B_i$;

and wherein said boosting step includes the step of boosting the transmitted power of said signals by said larger power boost $B_{l_{gi}}$ in response to the start of each power fade F that exceeds the sum of said static power margin $M_i$ and said power boost $B_i$.

4. A method of enhancing service and service cost in a communication region served by a mobile communication system in which reception during the absence of power fades requires that transmitted power exceed a power threshold $P_{th}$, the method comprising the steps of:

receiving transmitted signals in said communication region to obtain a signal-fading record;

analyzing said signal-fading record to find availability and energy cost for each of a plurality of power-control parameter sets $S_i$ wherein availability is the percentage of transmitting time in which signals are received, energy cost represents the average energy needed to transmit a received bit of information, and an ith power-control parameter set $S_i$ includes a selected static power margin $M_i$, a selected power boost $B_i$ and a selected hold time $T_i$;

choosing a maximum energy cost $C_{max}$ for said communication region;

from those power-control parameter sets whose energy cost does not exceed said maximum energy cost $C_{max}$, selecting a selected power-control parameter set which has the greatest availability; and subsequent to said receiving, analyzing, choosing and selecting steps, transmitting communication signals to said communication region with said selected power-control parameter set.

5. The method of claim 4, wherein said transmitting step includes, for a power-control parameter set $S_i$, the steps of:

transmitting signals with power equal to the sum of said power threshold $P_{th}$ plus said static power margin $M_i$;

in response to the start of each power fade F that exceeds said static power margin $M_i$, boosting the transmitted power of said signals by said power boost $B_i$; and in response to the end of each power fade F, terminating said boosting step after said hold time $T_i$.

6. The method of claim 5, wherein said $i^{th}$ power-control parameter set $S_I$ also includes a selected larger power boost $B_{I_{lgr}}$ that is larger than said power boost $B_i$;

and wherein said boosting step includes the step of boosting the transmitted power of said signals by said larger power boost $B_{I_{lgr}}$ in response to the start of each power fade F that exceeds the sum of said static power margin $M_I$ and said power boost $B_i$.

7. The method of claim 1, further including the steps of:

selecting said power margin $M_i$ from a group that includes 1, 3 and 5 decibels;

selecting said boost $B_i$ from a group that includes 1, 3 and 5 decibels; and selecting said hold time $T_i$ from a group that includes 0, 2 and 4 seconds.

8. The method of claim 4, further including the steps of:

selecting said power margin $M_i$ from a group that includes 1, 3 and 5 decibels;

selecting said boost $B_i$ from a group that includes 1, 3 and 5 decibels; and selecting said hold time $T_i$ from a group that includes 0, 2 and 4 seconds.

* * * * *